(12) United States Patent
Faber (10) Patent No.: US 7,160,104 B2
(45) Date of Patent: Jan. 9, 2007

(54) PORTABLE ELECTRONIC EQUIPMENT WITH INTEGRATED LIGHTER

(75) Inventor: Ulrich Faber, Tokyo (JP)

(73) Assignee: NEC Corporation, Tokyo (JP)

(*) Notice: Subject to any disclaimer, the term of this patent is extended or adjusted under 35 U.S.C. 154(b) by 42 days.

(21) Appl. No.: 10/911,274

(22) Filed: Aug. 4, 2004

(65) Prior Publication Data

US 2005/0053883 A1   Mar. 10, 2005

(30) Foreign Application Priority Data

Aug. 8, 2003   (JP)   ............................. 2003-289927

(51) Int. Cl.
  F23D 5/12   (2006.01)
  F23D 11/36   (2006.01)
  F23Q 7/12   (2006.01)
  F23Q 2/16   (2006.01)
  F23Q 2/32   (2006.01)

(52) U.S. Cl. ................ 431/253; 431/153; 431/14; 431/255; 431/131; 431/132; 431/146; 431/150

(58) Field of Classification Search ............... 431/253, 431/14, 19, 153, 75, 254, 255, 131, 132, 431/146, 150; 455/566, 575.7, 550.1, 90.3; 379/440, 433.11
See application file for complete search history.

(56) References Cited

U.S. PATENT DOCUMENTS

| | | | | |
|---|---|---|---|---|
| 4,102,631 A | * | 7/1978 | Goto | ............... 431/253 |
| 4,487,570 A | * | 12/1984 | Lowenthal | ........... 431/130 |
| 4,517,994 A | * | 5/1985 | Endelson | ............. 131/329 |
| 5,003,960 A | * | 4/1991 | Hanagan | ........... 126/39 BA |
| 5,067,895 A | * | 11/1991 | Chuang et al. | ........ 431/253 |
| 5,945,954 A | * | 8/1999 | Johnson | ............. 343/702 |
| 6,076,451 A | * | 6/2000 | Studer | ................ 99/340 |
| 6,307,142 B1 | * | 10/2001 | Allen et al. | .......... 136/205 |
| 2005/0032482 A1 | * | 2/2005 | Brudos | ............... 455/90.3 |

FOREIGN PATENT DOCUMENTS

| | | |
|---|---|---|
| EP | 1 484 901 A1 * | 12/2004 |
| JP | 55-049619 A * | 4/1980 |

(Continued)

OTHER PUBLICATIONS

English translation of Japanese Patent No. 55-49619.*

(Continued)

*Primary Examiner*—Carl D. Price
(74) *Attorney, Agent, or Firm*—Muirhead and Saturnelli, LLC (57) ABSTRACT

A lighter has been integrated into portable electronic equipments such as cellular phones, PDAs, or portable game players. The lighter can be completely stowed within the portable electronic equipment so that no parts protrude out of the portable electronic equipment's housing. Thereby not only the size can be reduced but also damage and entanglement with other things the portable electronic equipment is kept together as well as injuries can be avoided. The lighter is operated by a switch which is implemented as button either on the side of the portable electronic equipment or as a GUI menu or button on the display unit. When pressing the switch button the cover on the outlet of the lighter is being removed while at the same time a cylinder is being extended and moving out of the outlet, and a flame ignited in the burner unit appears from inside of the cylinder. The lighter includes a fuel tank which can be either fixed or removable as for instance fuel gas cartridges. A function for detecting the fuel gas amount and displaying it on the screen and a security function to lock the burner of the lighter are also provided.

18 Claims, 10 Drawing Sheets

FOREIGN PATENT DOCUMENTS

| | | |
|---|---|---|
| JP | 2908432 | 4/1999 |
| JP | 3091568 | 11/2002 |
| WO | WO 2005/043040 A1 * | 5/2005 |

OTHER PUBLICATIONS

Korean Utility Model, No. 0188062, Jul. 15, 2000.

* cited by examiner

PORTABLE ELECTRONIC EQUIPMENT WITH INTEGRATED LIGHTER

BACKGROUND OF THE INVENTION

1. Field of the Invention

The present invention is related to portable electronic equipment, for example, cellular phones, PDAs, and game players, and more particularly to portable electronic equipment with integrated lighter.

2. Description of the Related Art

Recently, portable electronic equipment, especially cellular phones have become so widespread and the number of people carrying electronic equipments, especially cellular phones, PDAs (personal digital assistants), and game players have much increased in urban areas. The functions of portable electronic equipment also have become so diverse in these days. For example, a cellular phone is not only equipped with the conventional function of transmitting and receiving voice or data but also has got functionality even of a camera and a remote controller. Much more functions are expected to be added and hence cellular phones and other portable electronic equipment are becoming portable all-purpose equipment.

For the sake of omitting the description of various functions and items of portable electronic equipment, a cellular phone is taken as a general representative example of portable electronic equipment in the following description.

Whenever new and convenient functions and accessories are added to a cellular phone, the original function is maintained and can be fully used while the number of the items that you usually would carry separately with you is reduced. This reduces the weight and the volume of your belongings, thereby making it easy to accommodate the cellular phone with all functions and accessories in a bag or a pocket. At the same time as the number of items that you carry with you is decreased, the probability that you leave something behind or forget or even lose something is reduced.

When someone goes out leaving his house or apartment, he or she always carries the key with him or her. When instead of a key, a cipher signal used for an electronic lock that is wirelessly transmitted to the lock from a cellular phone, the conventional key is not necessary anymore, hence, the number of the carried items can be reduced. Similarly, when functionality of a cash card for a bank is provided by a cipher signal modulated on a wireless signal, it is not necessary anymore to carry a cash card that can be easily forgotten or lost.

A lighter is one of the items very often that are carried in pockets or bags. A lighter is used for example to light a cigarette. Provided that you are a smoker it may be a nuisance when you have left the lighter behind or lost it. When a lighter is mounted on a cellular phone, it is possible to prevent from losing or leaving it behind. A conventional technique in which a lighter is mounted on a cellular phone is disclosed in the Japanese Patent Utility No. 3091568 (page. 7 to 10, FIG. 1 and FIG. 5) (hereinafter, referred to as the article 1).

In article 1, a method has been proposed, for attaching a lighter to the distal end of an antenna of a cellular phone with a screw so that it can also be removed again. However, when using it or when attaching it to the screw or removing it therefrom, there is a danger that the antenna body may be deformed and bent by the weight of the lighter, which may cause the interruption of transmission and reception.

Figure 13:
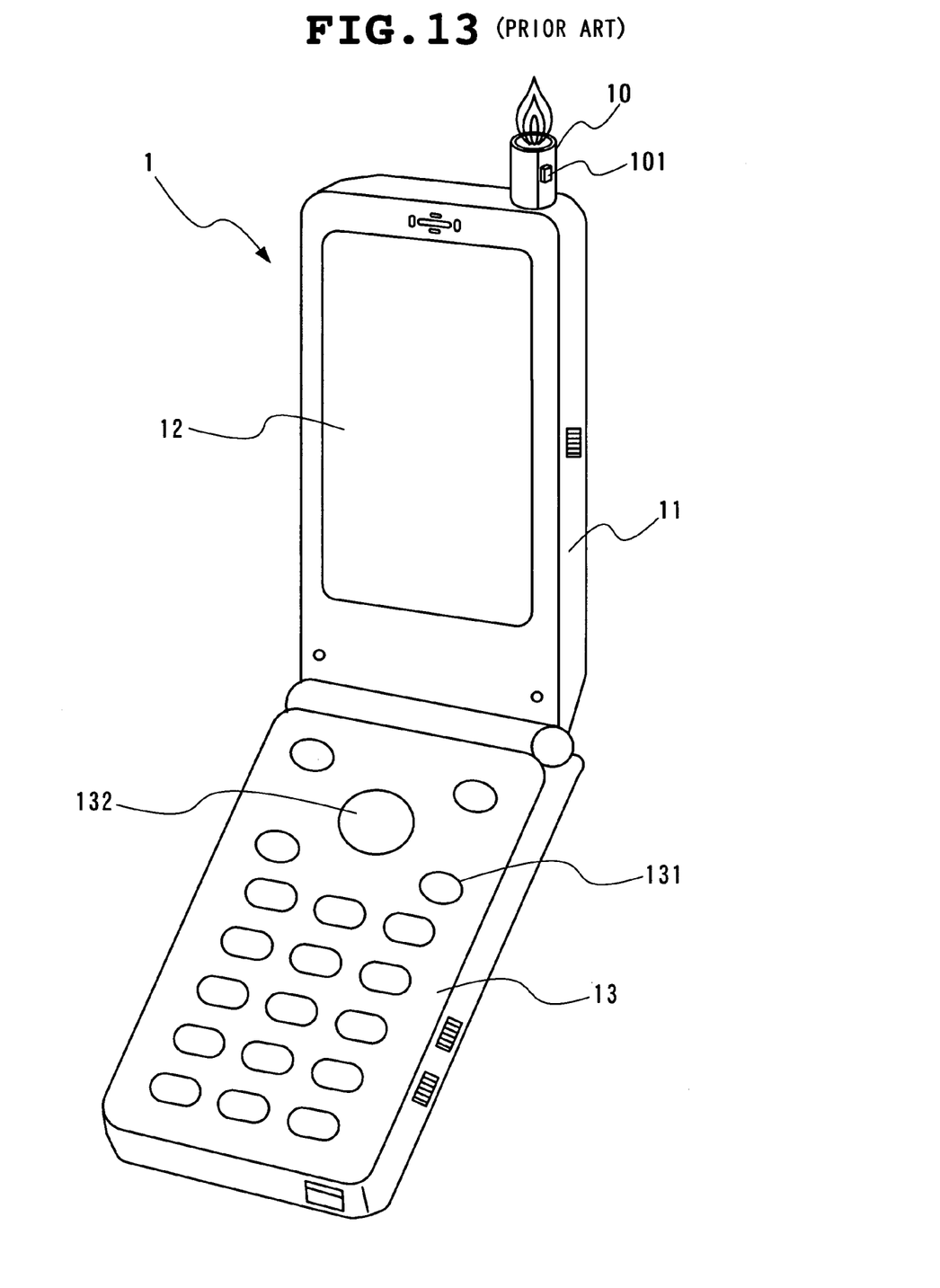
FIG. 13 is a perspective view of a cellular phone having the conventional lighter.

Another embodiment of the above article 1 shown in FIG. 13 depicts a conventional technique for preventing from interruption of transmission and reception. As illustrated in FIG. 13, a structure has been proposed in which the antenna body is removed and instead of the antenna, an external lighter 10 is directly mounted on the housing 11 of a cellular phone 1 by a screw thread connection. An ignition button 101 for the external lighter is provided on the lateral side of the external lighter 10 and ignition is triggered by pushing this button.

In the above-described conventional techniques, a lighter is mounted onto the housing of a cellular phone in a way that it is protruding from the phone housing, which is a serious problem. When putting the cellular phone with the protruding lighter into a trouser pocket, there is a danger of damaging or injuring you. When putting it into a bag, there is a danger that the protruding part gets entangled with other things and thereby damaging the bag and the other things.

In the conventional technique shown in FIG. 13, it is possible to prevent from interruption of communication caused by bending the antenna. However, when removing the lighter in order to refill it with liquid gas, it may be left behind or lost again. Further, in order to use the lighter, the antenna has to be once removed before the lighter can be attached on the housing, which is troublesome.

SUMMARY OF THE INVENTION

In order to solve the above mentioned problems of the prior art, an objective of the invention is to provide portable electronic equipment including a lighter which can prevent from leaving behind and losing a lighter by integrating the lighter into the portable electronic equipment, e.g. a cellular phone.

Another objective of the invention is to provide portable electronic equipment including a lighter in which, since a lighter is built into the equipment, the lighter can be always carried along without leaving it behind when it has been removed from the equipment. And when a user carries the portable electronic equipment putting it into a pocket and a bag, injury to the user and damage of the equipment caused by entanglement with cloth or thread of the bag can be prevented by integrating the lighter completely into the equipment to make the surface of the portable electronic equipment even without any projection.

Yet another objective of the invention is to provide portable electronic equipment including a lighter which size can be reduced while increasing the number of functions.

Further another object of the invention is to provide portable electronic equipment including a lighter which can be refilled with fuel and where the remaining amount of fuel can be easily checked.

Further another object of the invention is to provide portable electronic equipment including a lighter with enhanced security by providing a mechanism of restricting the use to non-authorized persons or infants and prevent from burn injuries from the portable electronic equipment when using the built-in lighter.

According to the first aspect of the invention, portable electronic equipment is composed of at least a key operation unit and a display unit and include a lighter for lighting a flame, wherein a lighter unit for generating a flame is integrated into the housing of the portable electronic equipment.

In the preferred construction, the lighter unit comprises a fuel tank built into the housing, an ignition unit and a switch which controls the flow of fuel gas from the fuel tank to a burner portion provided at an end of the housing and which drives the ignition unit to light a flame.

In another preferred construction, the switch is positioned at a lateral side of the housing in order to open and close a cover for covering the burner portion. When the switch opens the cover, the fuel gas of the fuel tank flows out from the burner portion, and the ignition unit is operated to ignite the fuel gas.

In another preferred construction, an extensible cylinder is provided in the burner portion at the end of the housing.

In another preferred construction, an extensible cylinder is provided in the burner portion at the end of the housing, the switch is positioned at a lateral side of the housing in order to open and close a cover for covering the burner portion, when the switch opens the cover, the fuel gas of the fuel tank flows out from the extensible cylinder, and the ignition unit is operated to ignite the fuel gas, and the extensible cylinder is extended and protruded outward from the housing when the switch opens the cover. The extensible cylinder is drawn back and accommodated into the housing when the switch closes the cover.

In another preferred construction, an antenna body which does not protrude outward is built into the housing.

In another preferred construction, the lighter unit comprises a cartridge type fuel tank.

In another preferred construction, the lighter unit comprises a fixed fuel tank.

In another preferred construction, the lighter unit comprises a fuel tank built in the housing, the ignition unit, and a switch which controls the flow of fuel gas from the fuel tank to a burner portion provided at an end of the housing and operates the ignition unit to light a flame, and a confirmation window for confirming the amount of fuel in the fuel tank is provided in the housing.

In another preferred construction, the portable electronic equipment with integrated lighter comprises a pressure detector which is set within the fuel tank in order to measure the fuel amount, an internal state controller which controls the pressure detector, converts pressure data into fuel amount data, and stores the fuel amount data as latest fuel amount data, a controller which controls messages of pressure measurement request and pressure measurement reply between the internal state controller and the pressure detector, and a display controller which converts the latest fuel amount data sent from the controller into predetermined data for display indicating the fuel amount, where the data for display is displayed on a screen of the portable electronic equipment according to the operation of the display controller.

In another preferred construction, predetermined data for display indicating the fuel amount is displayed on the screen as icon.

In another preferred construction, the data for display is displayed on a screen of the portable electronic equipment controlled by selection of a menu key of the operation unit.

In another preferred construction, the lighter built-in portable electronic comprises a lock portion which opens and closes the cover of the fuel tank controlled by the internal state controller.

According to another aspect of the invention, a lighter unit provided in portable electronic equipment having at least a key operation unit and a display unit, being included in a housing of the portable electronic equipment, which comprises a fuel tank built in the housing, the ignition unit, and a switch which controls the flow of fuel gas from the fuel tank to a burner portion provided at an end of the housing and operates the ignition unit to light a flame.

In another preferred construction, the lighter unit for the portable electronic equipment comprises a pressure detector which is set within the fuel tank in order to measure the fuel amount, an internal state controller which controls the pressure detector, converts pressure data into fuel amount data, and stores the fuel amount data as latest fuel amount data, a controller which controls messages of pressure measurement request and pressure measurement reply between the internal state controller and the pressure detector, and a display controller which converts the latest fuel amount data sent from the controller into predetermined data for display indicating the fuel amount, wherein the data for display is displayed on a screen of the display unit of the portable electronic equipment according to the display controller.

In another preferred construction, the lighter unit for the portable electronic equipment comprises a lock portion which enables or disables the opening and closing of the cover of the fuel tank as well as the ignition of fuel gas in the burner portion, and thereby restricts the use of the lighter, according to control of the internal state controller.

As outlined in the above description, integrating a lighter into the portable electronic equipment such as a cellular phone, it can be prevented from leaving behind or losing the lighter. Further, since an antenna body is also included into the main housing, the entire size can be largely reduced, and any kind of protruding parts disappear on the cellular phone, thereby preventing from injuries and damage caused by entanglement with other things the portable electronic equipment touches or is carried.

Other objects, features and advantages of the present invention will become clear from the detailed description given here below.

BRIEF DESCRIPTION OF THE DRAWINGS

The present invention will be understood better from the detailed description given here below and from the accompanying drawings of the preferred embodiment of the invention, which, however, should not be taken to be limitative to the invention, but are for explanation and understanding purposes only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order not to unnecessarily obscure the present invention.

The invention will be described with reference to the drawings.

Figure 1:
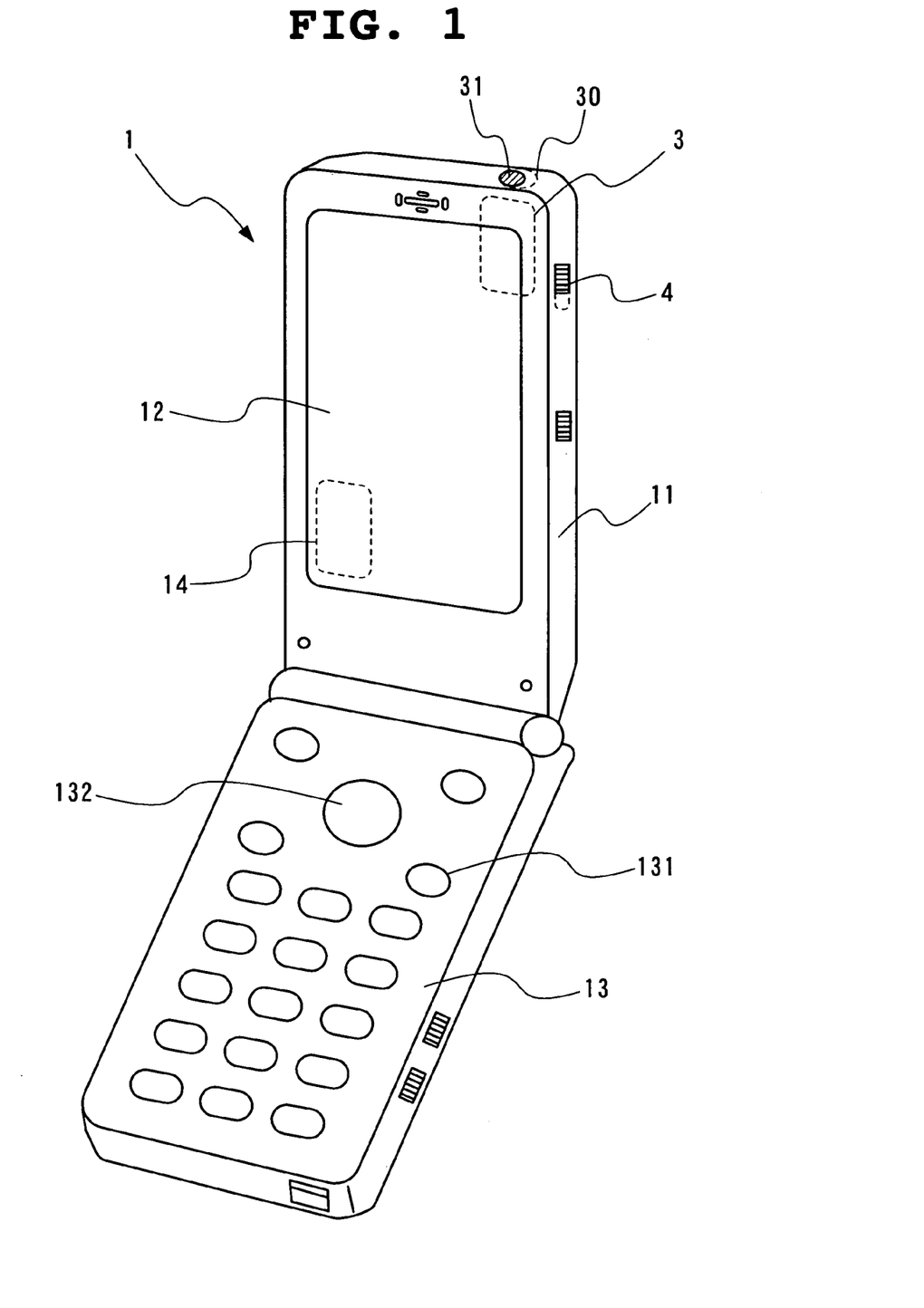
FIG. 1 is a perspective view of a cellular phone according to a first embodiment of the invention.
Figure 3:
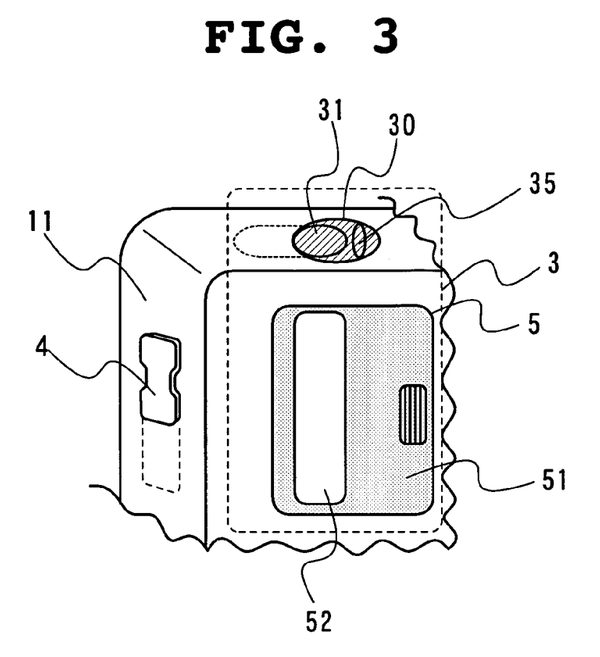
FIG. 3 is a perspective view showing the state of a integrated lighter for use in the first embodiment at idle time when it is not operated.
Figure 4:
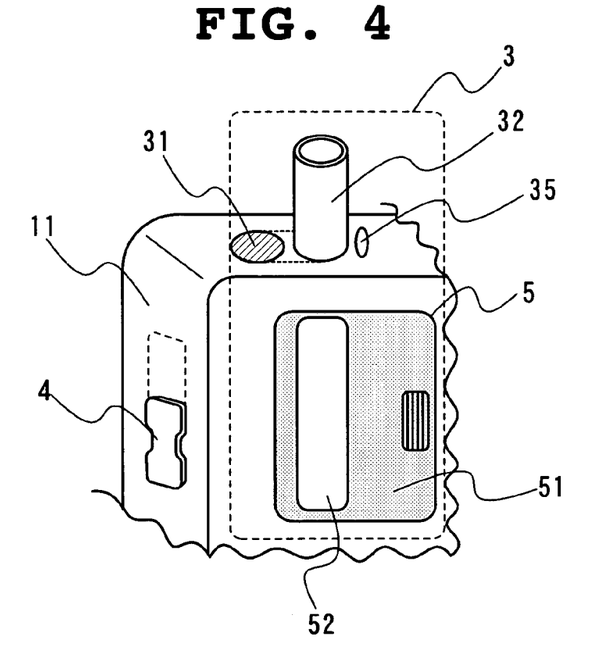
FIG. 4 is a perspective view showing the state before ignition of the integrated lighter for use in the first embodiment at the time of operation.
Figure 5:
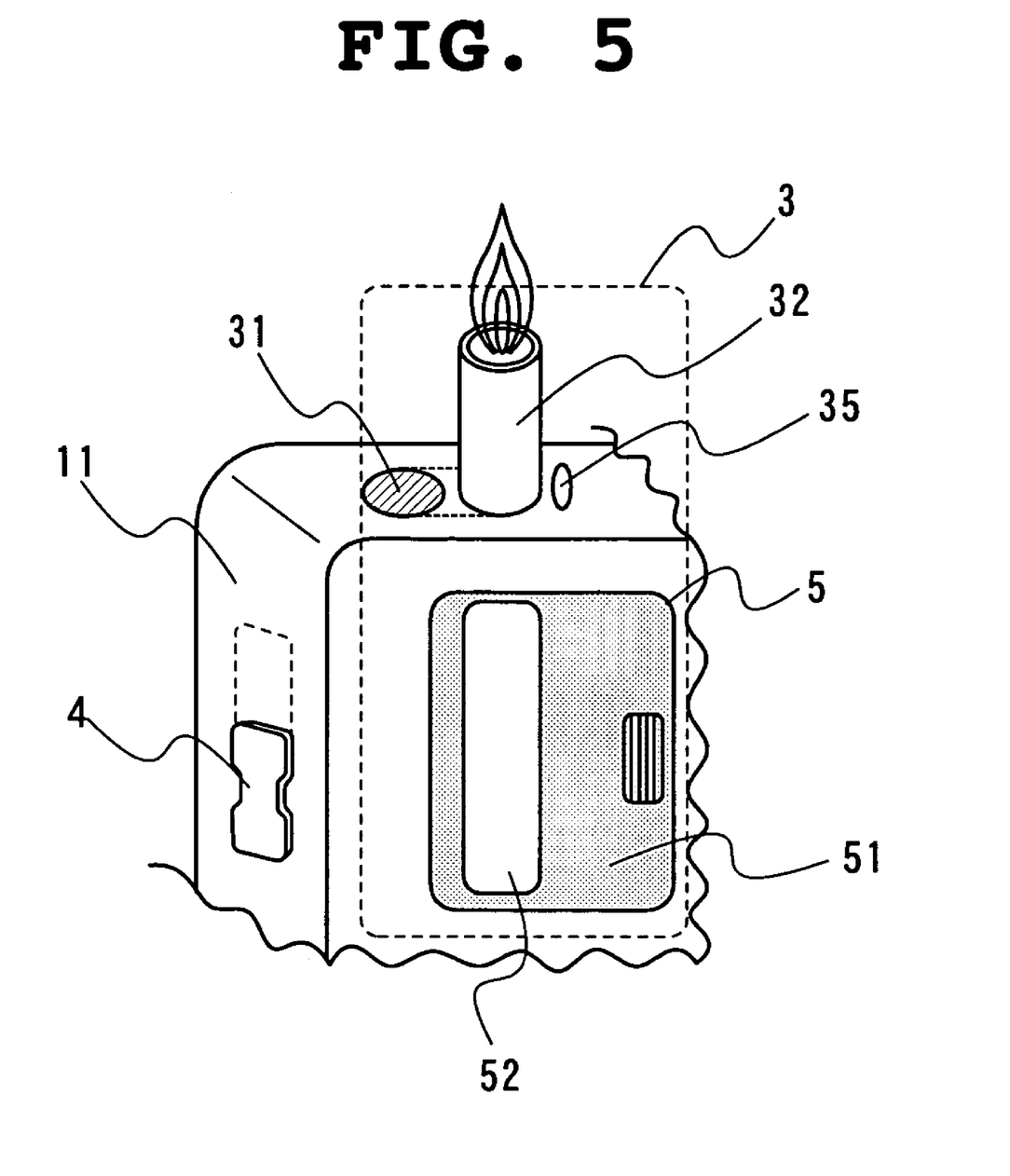
FIG. 5 is a perspective view showing the state of the integrated lighter for use in the first embodiment at the time of ignition.
Figure 6:
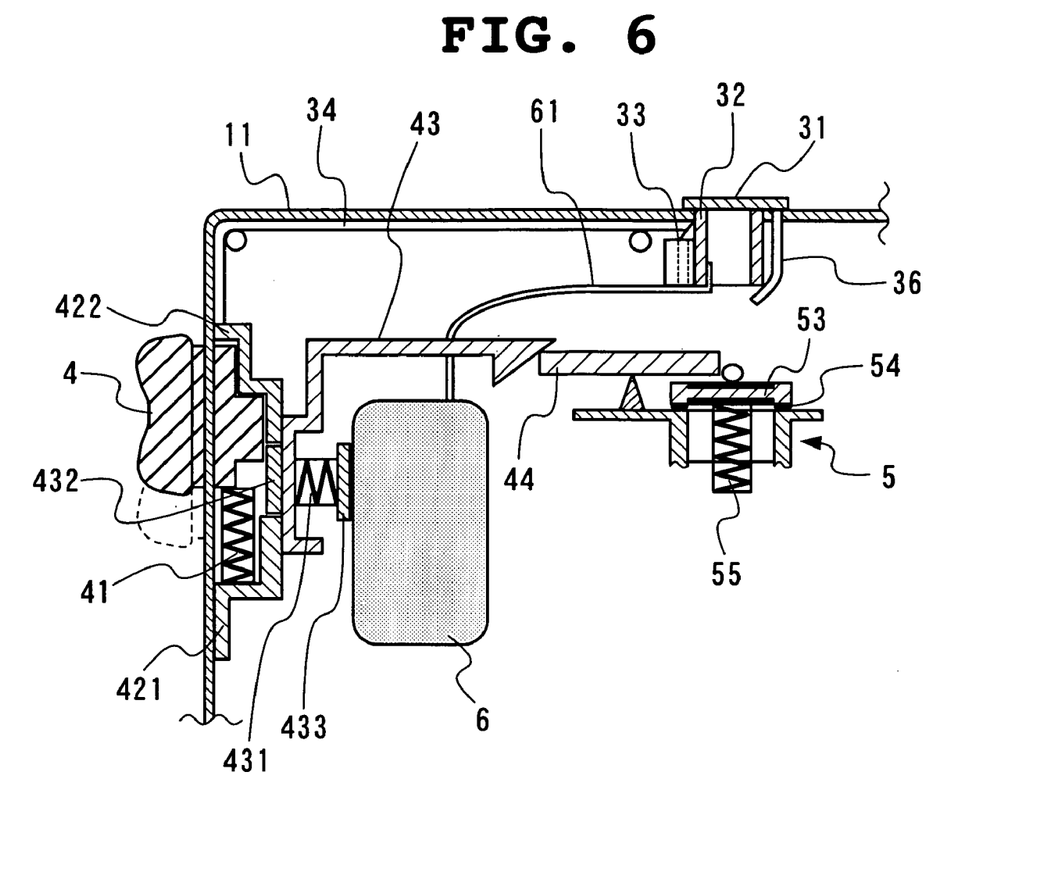
FIG. 6 is a cross sectional view showing the detail inside the integrated lighter for use in the first embodiment at idle time when it is not operated.
Figure 7:
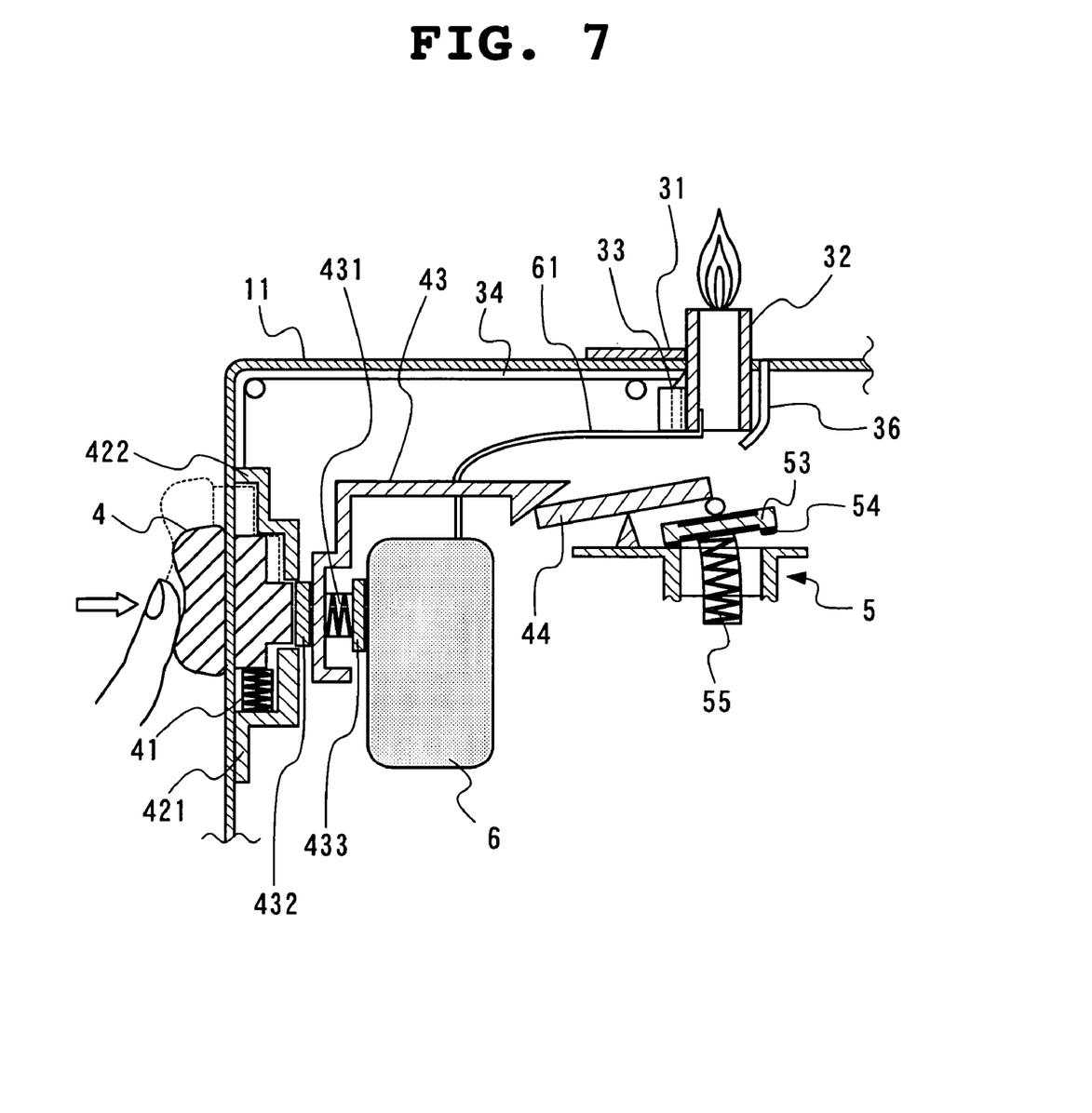
FIG. 7 is a cross sectional view showing the details inside the integrated lighter for use in the first embodiment at the time of operation and ignition.
Figure 8:
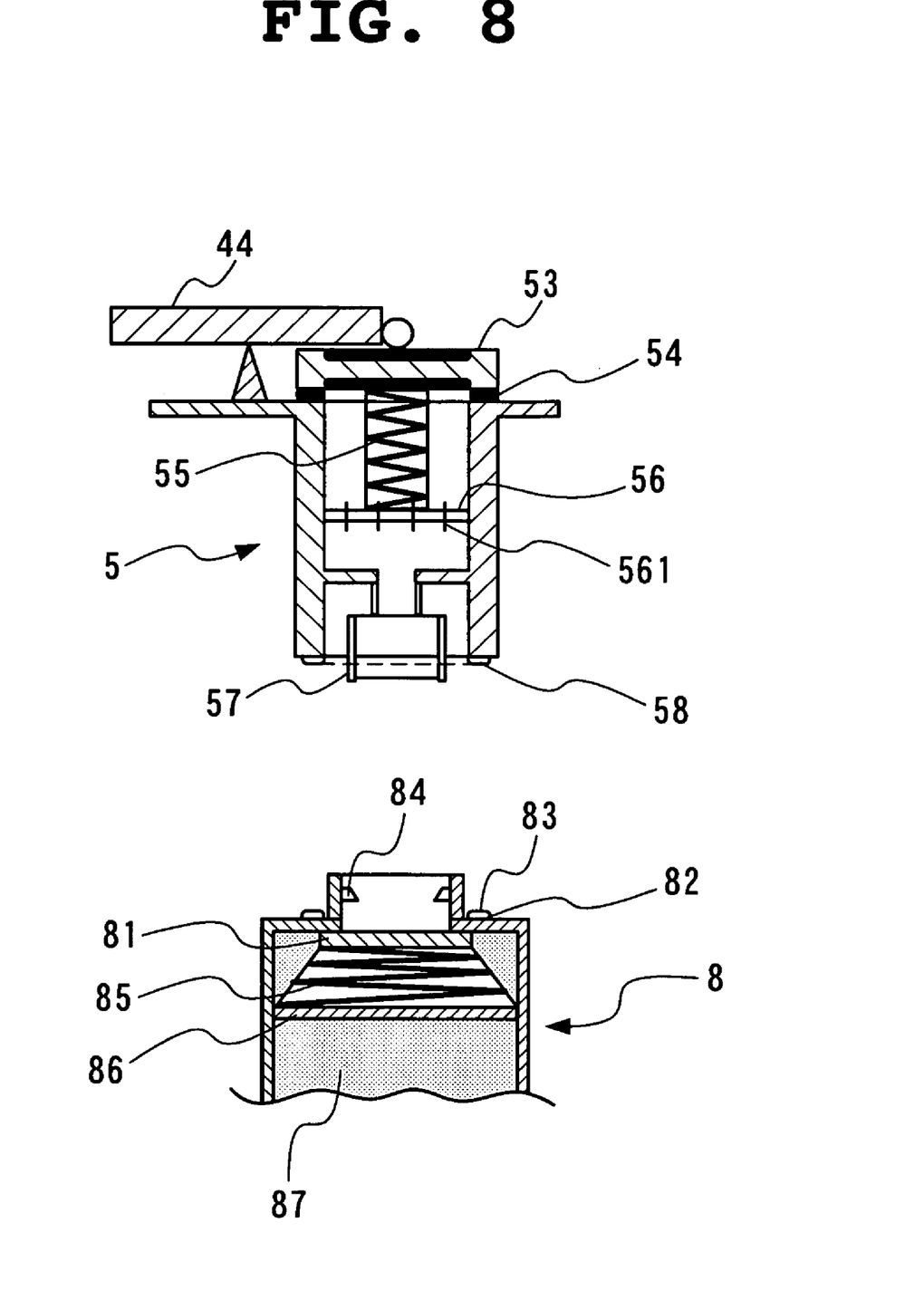
FIG. 8 is a cross sectional view of a fuel tank and a fuel cartridge in the integrated lighter of the first embodiment.

FIG. 1 is a perspective view of a cellular phone according to a first embodiment of the invention; FIGS. 3 to 5 are perspective views respectively showing the states of the integrated lighter for use in this embodiment at the time of non-operation, before ignition at the time of operation, and at the time of operation and ignition; FIGS. 6 and 7 are cross sectional views showing the details inside the integrated lighter respectively at the time of non-operation and the time of operation and ignition; and FIG. 8 is a cross sectional view of the fuel tank and the fuel cartridge in the integrated lighter according to the first embodiment.

In the following embodiments, a description will be made by taking a cellular phone as a representative example of the portable electronic equipment.

With reference to FIG. 1, a cellular phone 1 of the first embodiment is formed by a clamshell housing 11 capable of folding around a hinge, a screen 12 for display is provided on one inner surface of the folded housing 11, and a key operation board 13 including a menu key 131 and a selection key 132 is provided on the other surface. On the rear side of the screen 12 of the housing 11, a integrated antenna 14 is embedded in the portion near the hinge and a integrated lighter 3 is embedded in the distal end portion of the housing opposite to the hinge.

In this first embodiment, it is preferable that an extensible antenna body or a fixed antenna body protruding outward from the housing 11 is removed and the antenna body is integrated into the housing by using an antenna realized on a print board disclosed in, for example, Japanese Patent Publication No. 2908432, a wire antenna spiraled in the housing, or an antenna realized by a circuit embedded into a thin film board or a flexible print board.

The structure of the integrated lighter 3 is described as follows. A slide switch 4 for ignition is provided on the lateral side of the housing 11 of the cellular phone 1 in order to operate the integrated lighter 3. An outlet hole of a burner 30 is provided on the top lateral surface of the housing 11 in order to let out fire from the integrated lighter 3. Further, a burner cover 31 is provided for opening and closing the burner 30. As illustrated in FIG. 1, a slide switch 4 for ignition is normally placed at the upper position and the burner 30 is covered with the burner cover 31 and closed.

Hereinafter, the detailed structure of the integrated lighter 3 will be described with reference to FIG. 3, FIG. 4, and FIG. 5. FIG. 3, FIG. 4, and FIG. 5 show the portion of the integrated lighter 3 on the rear surface of the housing 11 of the cellular phone 1. In the first embodiment the fuel tank 5 is a cartridge type fuel tank.

The slide switch 4 for ignition is in the upper position, as illustrated in FIG. 3, in the state where the slide switch 4 for ignition is not in the operation. At that time, the burner 30 and a vent 35 nearby are closed, being covered by the burner cover 31. FIG. 4 shows the state of the integrated lighter 3 when the slide switch 4 for ignition moves downward. As soon as the slide switch 4 for ignition moves downward, the burner cover 31 is drawn to the left, hence the vent 35 is opened, and at the same time, a burner extensible cylinder 32 is lifted out from the burner 30. As illustrated in FIG.5, when the slide switch 4 for ignition is pushed in at the lower position, a flame comes out of the burner extensible cylinder 32. Unless the slide switch 4 for ignition is pushed in at the lower position, it never lights. Needless to say, the burner extensible cylinder 32 and the burner cover 31 are made of state of the art heat resistant and non-burnable material.

Though the burner extensible cylinder 32 is formed in a circular cylinder in this embodiment, it may be formed in a rectangular cylinder as far as the cylinder is extensible.

The operation of the integrated lighter 3 of the first embodiment will be described with reference to FIG. 6 and FIG. 7. FIG. 6 shows the state in which the integrated lighter 3 is not operated, while FIG. 7 shows the state in which the integrated lighter 3 is operated and ignited.

At first, the details of the normal idle state of the non-operating integrated lighter 3 will be described with reference to FIG. 6. A lower support spring 41 mounted on a switch lower partition 421 pushes the slide switch 4 for ignition upward until the switch 4 reaches a switch upper partition 422 by repulsion in expanded state. At this time, a compressive spring 431 also pushes the slide switch 4 for ignition outward through a first force transmissive part 432 by repulsion in expanded state. Simultaneously, a fuel tank switching part 43 is moved away from a fuel tank switching lever 44 by repulsion of the compressive spring 431 of the switch and the tensile force of a fuel discharge opening spring 55 closes the cover 53 of a fuel discharge opening of the fuel tank 5. As mentioned above, when the burner cover 31 covers the burner 30 and the vent 35, the burner extensible cylinder 32 is shrunk and drawn back into the housing 11.

When a user wants to operate the integrated lighter 3, at first, the slide switch 4 for ignition is put down with the finger. When the slide switch 4 for ignition is put down, it borders on the upper portion of the switch lower partition 421 and stops there. When the slide switch 4 for ignition is put down, an extension activating part 34 transmits a signal to an extension operator 33 and the extension operator 33 opens the burner cover 31 to let the burner extensible cylinder 32 extend from the burner 30. The extension activating part 34 may be realized by, for example, a mechanism of precision instrument, chain or line, or a wire for electrically transmitting a signal.

The details of the operation and the function at the time of putting a light with the integrated lighter 3 will be described with reference to FIG. 7. When the slide switch 4 for ignition is held at the lower position by the finger and pushed inward to the housing 11, the fuel tank switching part 43 is pushed rightward and the left side of the fuel tank switching lever 44 is pushed down. Thus, the right side of the fuel tank switching lever 44 is lifted up and the cover 53 for the fuel discharge opening connected to the right side of the fuel tank switching lever 44 is opened. When the cover 53 of the fuel tank discharge opening is opened, fuel gas starts flowing into the upper space from the fuel tank 5 and finally flows out of the housing 11 from the burner 30, after passing through the burner extensible cylinder 32.

When the slide switch 4 for ignition is pushed inward to the housing 11, the force compresses the compressive spring 431 of the switch through the first force transmissive part 432 and applies a force onto a piezo ignition system 6 through a second force transmissive part 433. The force causes electrons to flow into an ignition electrode 61 owing to the piezoelectric effect within the piezo ignition system 6. When the electric field of the final end of the ignition electrode 61 and the inner surface of the burner extensible cylinder 32 exceeds a certain value (about 30 kV/cm), discharge occurs and instantly sparks are generated. These sparks ignite the fuel gas flowing from the fuel tank 5 and a desired flame comes out of the burner extensible cylinder 32. Oxygen is transmitted from the open vent 35 through a vent tube 36 so that the flame does not extinguish.

When the finger releases the force on the slide switch 4 for ignition, the slide switch 4 for ignition is returned leftward by repulsion of the compressive spring 431 of the switch and further returned to the upper normal idle position by a repulsion of the lower support spring 41. At this time, by the fuel tank switching part 43 being pushed leftward and by the tensile force of the fuel tank discharge opening spring 55, the fuel tank switching lever 44 is returned to the parallel position and the cover 53 of the fuel tank discharge opening is closed. A fuel tank discharge opening packing 54 seals the cover 53 of the closed fuel tank discharge opening, hence stops the outflow of fuel gas from the fuel tank 5 and the flame extinguishes. When the slide switch 4 for ignition is returned upward, the extension operator 33 draws back the burner extensible cylinder 32 through the extension activating part 34, returns the burner cover 31, and closes the burner 3 and the vent 35.

Next, the structure of the fuel tank, a method of fuel supply and a method of confirming the fuel amount according to the embodiment will be described with reference to FIG. 3 and FIG. 8.

The integrated lighter 3 of this embodiment has the fuel tank 5 of cartridge type. FIG. 5 shows a fuel tank cover 51 for the fuel tank 5 of cartridge type, which is positioned at the rear surface of the housing 11 of the cellular phone 1. The fuel tank cover 51 is opened by sliding it rightward while pushing a specified portion by the finger. On the contrary, the opened fuel tank cover 51 is closed by sliding it leftward until it is locked. A transparent fuel amount confirmation window 52 is provided in the fuel tank cover 51, so that a user can confirm the fuel amount of the fuel tank (cartridge) 5 easily. When there remains a little fuel, the fuel tank cover 51 can be opened and the fuel cartridge 8 inside the fuel tank 5 can be replaced. As the fuel cartridge 8 reusable type that can be refilled or disposable type may be used.

FIG. 8 shows the details of the connection of the fuel tank 5 for cartridge with the fuel cartridge 8 according to the first embodiment. The fuel cartridge 8 is formed by a fuel cartridge opening and closing lid 81 which opens inwardly into the fuel cartridge 8, an inner packing 82 for sealing the lid in a state in which the fuel cartridge opening and closing lid 81 is closed, a compressed spring 85 for the fuel cartridge opening and closing lid, a stand 86 for the spring of the fuel cartridge opening and closing lid, for fixing the same spring 85 at the lower portion (the other end of the spring 85 is fixed to the fuel cartridge opening and closing lid 81), an external spring packing 83 which prevents the fuel gas 87 from leaking out when the cartridge is connected to the fuel tank 5 of the cellular phone 1, and a locking bolt 84 attached to the fuel tank to connect it to the fuel tank 5 of the cellular phone 1.

Accordingly, when the above fuel tank cover 51 is opened so to insert the fuel cartridge 8, the locking bolt 84 of the fuel cartridge 8 is inserted between a fuel cartridge sealing part 57 of the fuel tank 5 and the packing 58. In this case, the locking bolt 84 is engaged into the notch part of the fuel cartridge sealing part 57 and snaps in there. Hence the chambers of the fuel tank 5 and the fuel cartridge 8 join together. While they are joined, the fuel cartridge sealing part 57 pushes down the fuel cartridge opening and closing lid 81 so to open it and the fuel gas 87 fills the chamber of the fuel tank 5. Since the packing 58 is neatly engaged with the external spring packing 83, the fuel gas 87 will never leak out of the fuel tank 5 or the fuel cartridge 8. The cover 53 of the fuel discharge opening is usually sealed and closed by the extensible fuel discharge opening spring 55 fixed on the stand 56 in the fuel tank 5 and the fuel discharge opening packing 54. Since the seating plate 56 is interspersed with seating holes 561, the fuel gas 87 can expand and reach the cover 53 of the fuel discharge opening without trouble.

When the fuel gas 87 of the fuel cartridge 8 becomes a low of fuel gas or empty, the upper portion of the fuel cartridge 8 can be slightly pressed by two fingers to release the locking bolt 84 from the engaged position and, thus, the fuel cartridge 8 can be removed away easily for refilling or disposal.

Figure 2:
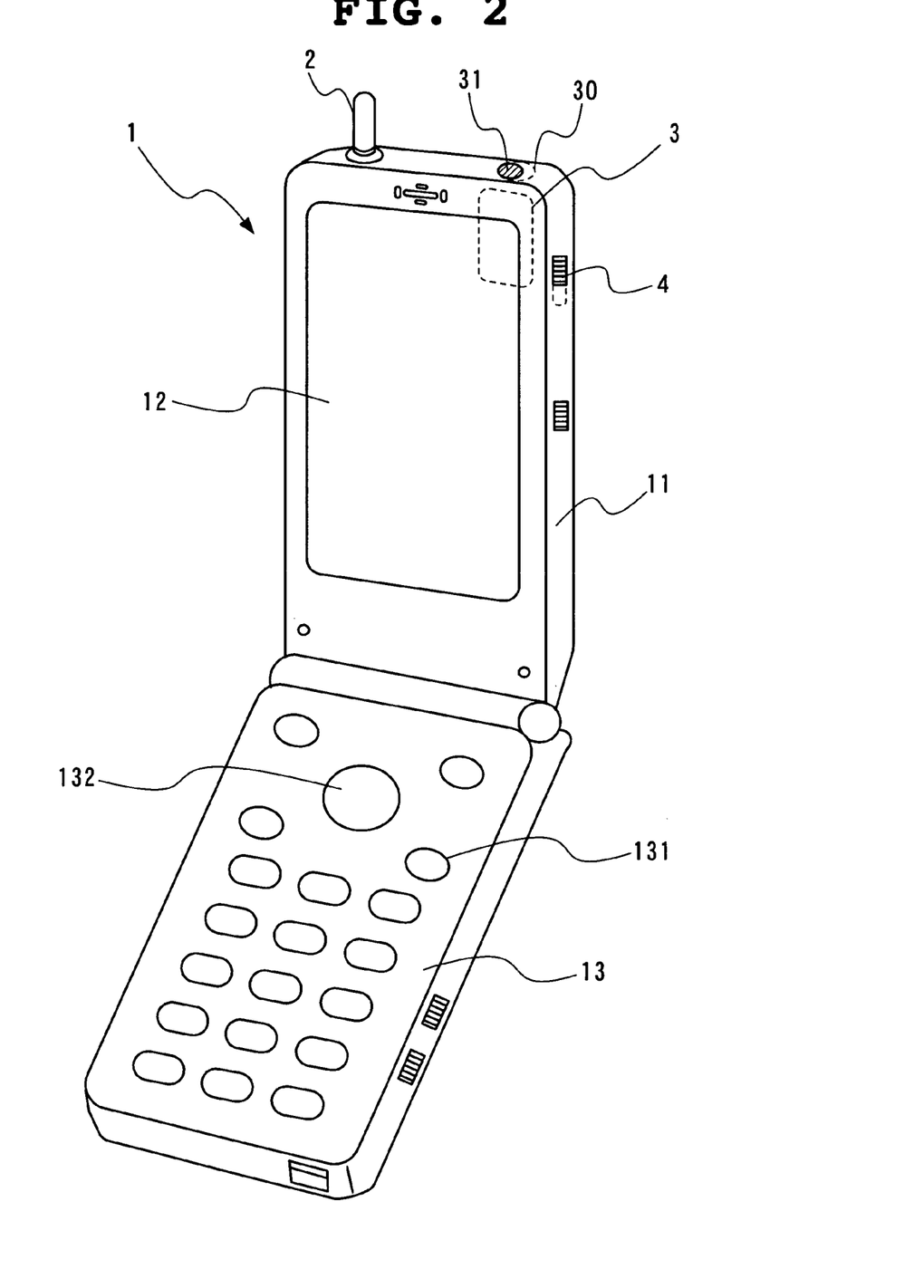
FIG. 2 is a perspective view of a cellular phone according to a second embodiment of the invention.

A second embodiment of the invention will be described, this time. FIG. 2 is a perspective view of a cellular phone according to the second embodiment.

The second embodiment is different from the first embodiment shown in FIG. 1 in that an external antenna is used, instead of the integrated antenna 14 in the cellular phone 1 of the first embodiment, and the other components are the same as those of the first embodiment.

As illustrated in FIG. 2, in the cellular phone 1 of the second embodiment, a screen 12 for display is provided on one inner surface of the clamshell housing 11 which can fold around a hinge and a key operation board 13 including a menu key 131 and a selection key 132 is provided on the other surface. On the rear side of the screen 12 of the housing 11, a integrated lighter 3 is embedded in one distal end portion of the housing opposite to the hinge and an external antenna 2 is mounted on the other end portion.

Since the structure and the operation as for the integrated lighter 3 and the structure of the fuel tank and the fuel supplying method are completely the same as in the case of the above-mentioned first embodiment, the detailed description is omitted here.

Figure 9:
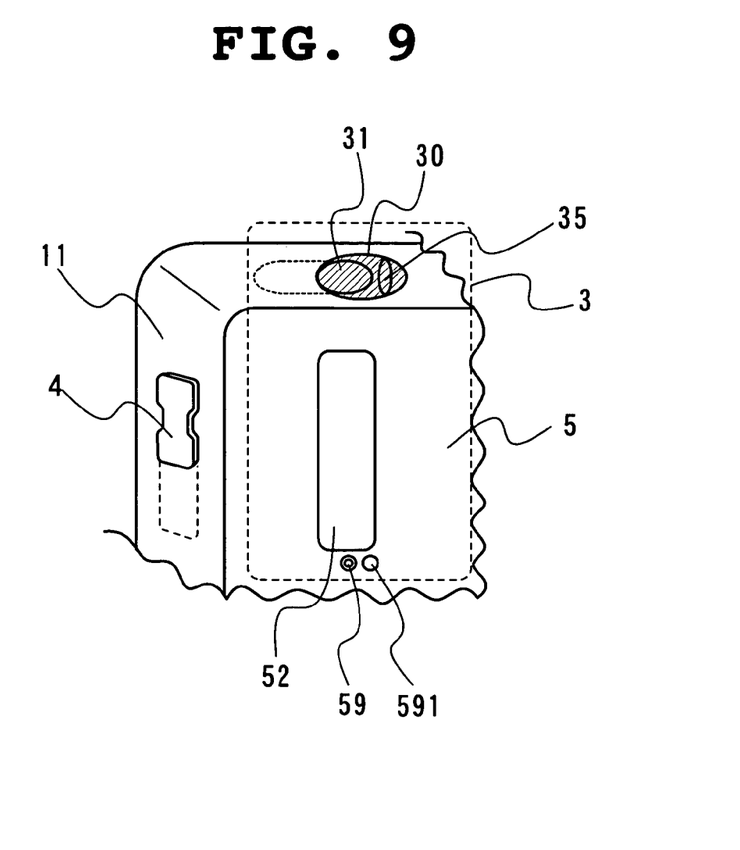
FIG. 9 is a perspective view of the integrated lighter using a fixed fuel tank according to a third embodiment of the invention.

A third embodiment of the invention will be described. FIG. 9 is a perspective view of a integrated lighter according to the third embodiment.

While the integrated lighters of the first and the second embodiments are furnished with a cartridge type fuel tank, the integrated lighter of the third embodiment uses a fixed fuel tank.

As illustrated in FIG. 9, a fixed fuel tank 5 is set within the integrated lighter 3 which is mounted within the housing 11 of the cellular phone 1. The structure and the operation of the burner 30 of the integrated lighter 3 and the structure and the operation concerned with the slide switch 4 for ignition are exactly the same in the case of the first embodiment.

Since it is the fixed fuel tank 5, it is not necessary to open the rear side of the cover 11 of the cellular phone 1 and hence there is no fuel tank cover. To confirm the fuel amount, a transparent fuel amount confirmation window 52 is provided on the housing 11. There is a fuel supply valve 59 for supplying the fuel gas 57 under the fuel amount confirmation window 52. At normal time of supplying no gas, the fuel supply valve 59 is covered with a fuel supply valve cover 591 and closed. Accordingly, it is possible to prevent from making ones clothes dirty.

Figure 10:
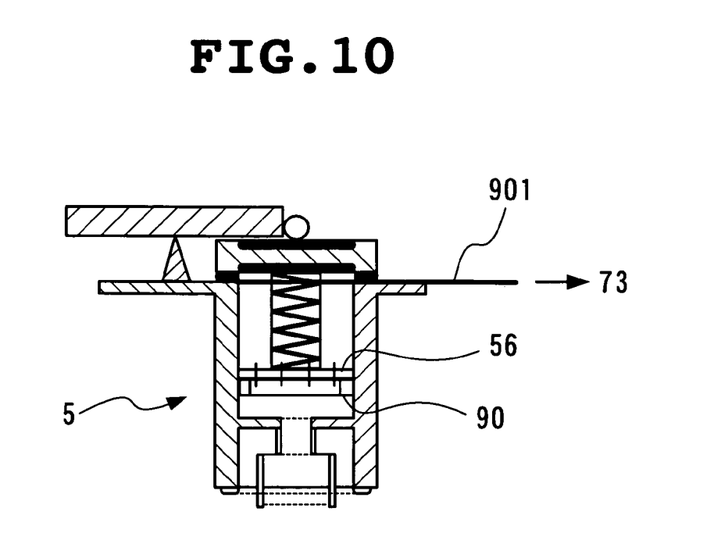
FIG. 10 is a cross sectional view showing a fuel pressure detector and connection adaptor with the fuel cartridge in the fuel tank according to a fourth embodiment of the invention.

A fourth embodiment of the invention will be described. FIG. 10 is a cross sectional view showing the fuel pressure detecting portion of a connection adaptor with the fuel cartridge in the fuel tank according to the fourth embodiment.

As illustrated in FIG. 10, a ring-shaped pressure detecting portion 90 is mounted on the lower portion of the spring stand 56 in the fuel tank 5. The pressure detecting portion 90 measures the pressure of the fuel gas 87, converts the information into a digital or an analog signal, and transmits it to an internal state controller 73 described later in FIG. 12 through the pressure detecting portion signal line 901. According to this, the internal state controller 73 converts the signal into the quantity corresponding to the pressure of the fuel gas 87 and stores the latest value. Since it is always possible to check the fuel amount, the amount of the fuel gas or refill request can be notified with icon or message on the screen 12 of the housing 11 of the cellular phone 1 or in the other method when there is only little fuel gas 87 remaining or when it is completely finished. The internal state controller 73 supplies also power to the pressure detecting portion 90.

Figure 12:
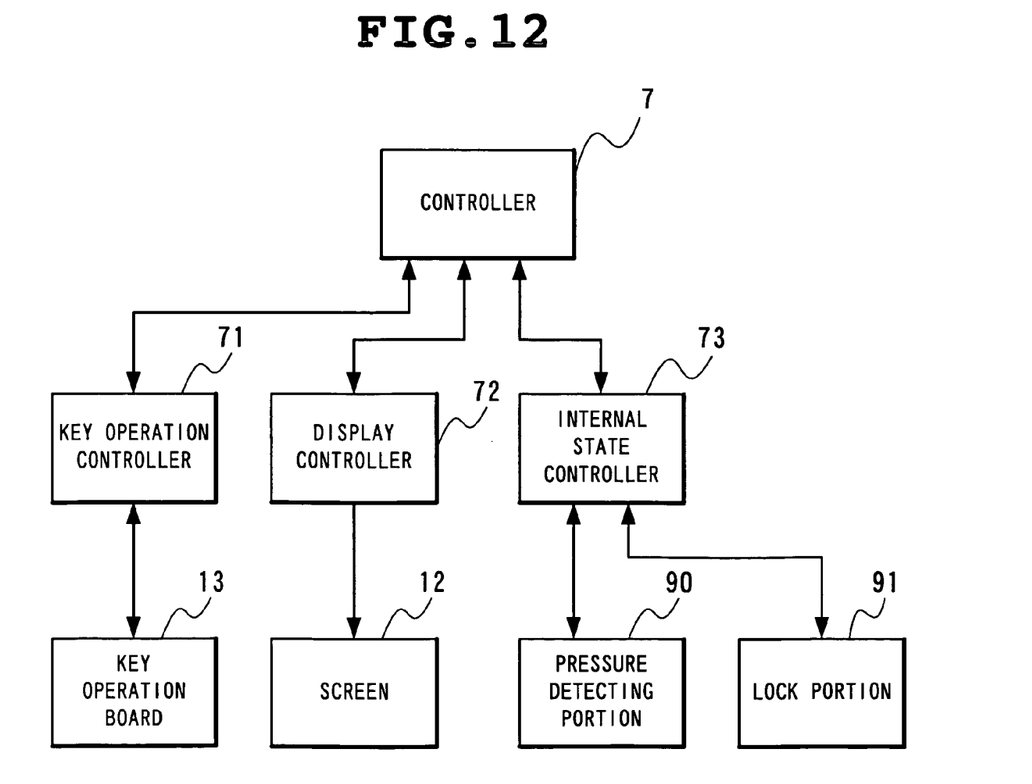
FIG. 12 is a block diagram showing the detection of the fuel gas amount, the state of notification control, and the state of lock portion control, in the fourth and the fifth embodiments.

FIG. 12 is a block diagram showing the detection of the amount of the fuel gas and the state of the notice control in this embodiment. The controller 7 of the cellular phone 1 controls the voice signal or data signal in the transmitting and receiving unit and also it connects with a key operation controller 71 of user interface or a display controller 72 for converting the information such as a message or image data into data for display or for the internal state controller 73 to grasp and control the internal state and information. Generally, the controller 7 is implemented by a CPU, a DSP, or an applied integrated circuit or a combination of those. In this fourth embodiment, when the power of the cellular phone 1 is turned on, the controller 7 transmits a fuel amount measuring request message to the internal state controller 73 in an idle state in which the other processing is not performed. In reply to this, the internal state controller 73 transmits the data corresponding to the latest fuel amount to the controller 7 as a fuel amount measurement report message.

In spite of the idle state of the controller 7, the internal state controller 73 periodically transmits a pressure measurement request message to the pressure detecting portion 90 and thus, the pressure detecting portion 90 measures the pressure of the fuel gas 87. The data of the measurement result is returned to the internal state controller 73 via the pressure detecting portion signal line 901. The internal state controller 73 converts the pressure measurement data into a value corresponding to the amount of the fuel gas by using a table or a numerical expression and then updates and stores the above as the latest fuel amount data.

When receiving a fuel amount measurement report message, the controller 7 transmits it to the display controller 72. The display controller 72 compares the fuel amount value taken out from the fuel amount measurement report message with the fuel amount table, converts the above into easy understandable icons like for instance full (90% and more), half and more (50% and more), 25% and more, a little left (5% and more), and empty (less than 5%), and displays these icons on the screen 12.

Alternatively, after pushing the menu key 131 of the key operation board 13 and selecting the fuel confirmation menu, the fuel amount value can be displayed. When only little fuel gas remains (5% and more), it is possible to display an alarm message on the screen 12.

Figure 11:
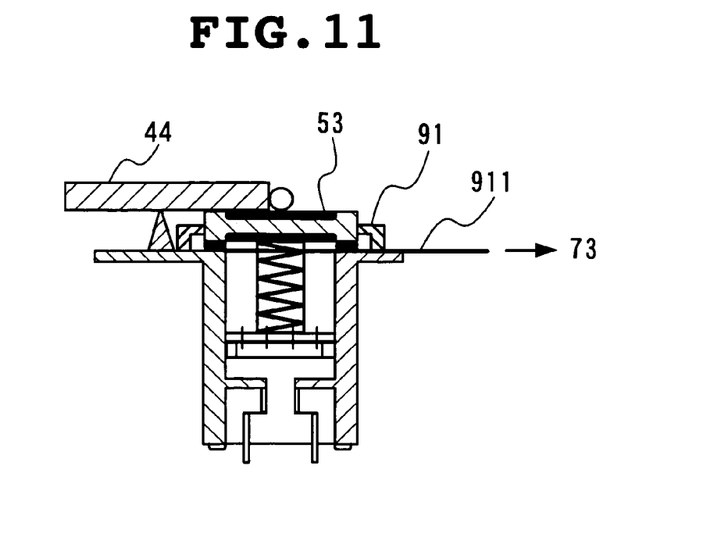
FIG. 11 is a cross sectional view showing a fuel tank cover lock portion of the connection adaptor with the fuel cartridge in the fuel tank according to a fifth embodiment of the invention.

A fifth embodiment of the invention will be described. FIG. 11 is a cross sectional view showing the fuel tank cover lock portion of the connection adapter with the fuel cartridge of the fuel tank in the fifth embodiment.

In the fifth embodiment a lock portion 91 to the cover 53 of the fuel discharge opening of the fuel tank 5 is added for safety purposes as illustrated in FIG. 11. The lock portion 91 is realized, for example, by a magnetic relay or by other opening and closing mechanisms. Power and a signal for setting the state of the lock portion 91 are supplied by the internal state controller 73 via the lock portion signal line 911. The lock portion 91 has two states including a lock state and an unlock state. When the lock portion 91 is set in the unlock state, the cover 53 of the fuel discharge opening will not open when operating the slide switch 4 for ignition. While, in the unlock state, the operation is the same as the operation of the fuel tank 5 having been described in the above-mentioned first embodiment.

In FIG. 12, the state of controlling the lock portion in this embodiment is shown by a block diagram. The operation of the fifth embodiment will be described with reference to FIG. 12.

In a state of turning on the power in the cellular phone 1, the menu key 131 is pushed on in the key operation board 13 and then a safety lock operation menu of the integrated lighter 3 can be selected. The safety lock operation menu can set the lock portion 91 unlock or lock. In order to enhance the security, a personal identification number can be input so as to prevent from changing the respective states without authorization.

Alternatively, it is possible to display the state of the lock portion 91 by using the icon on the screen 12. By taking such security measures it is possible to prevent a non-authorized person such as an infant from misusing the integrated lighter 3.

In the above-mentioned embodiments, since the detailed display and the detailed description of the parts is more or less omitted on the drawings, although the mechanical or electrical operation is not described enough in part, it is not the essential problem of the portable electronic equipment with integrated lighter of the invention. The invention is not restricted to the structure of the above-mentioned embodiments but it is needless to say that various modifications can be added without departing from the scope of the invention.

According to the invention, it is possible to prevent from leaving behind and losing a lighter by integrating the lighter into the portable electric equipment including a cellular phone. Further, since the lighter is built in, a situation that the lighter is removed and left behind never occurs and it can be always carried with the cellular phone. Since the lighter is completely integrated, the surface of the portable electronic equipment is always even without any projecting elements. Therefore, in the case where a user carries the lighter, putting it into a pocket or a bag, it is possible to prevent from injuring his or her body and damage caused by entanglement with thread of the cloth or bag or other things carried in the bag or pocket.

Since the lighter is equipped with a replaceable cartridge or a fixed fuel tank with a supply valve for refilling fuel, it can be easily integrated into the portable electronic equipment. In the future, when a fuel cartridge for a small lighter is standardized, a reusable cartridge and a disposable cartridge will be available in the market, thereby enhancing the utility.

Further, the fuel amount can be easily recognized from the window where the inside of the fuel tank can be seen and checked. Or even when the window cannot be provided there on the housing, it is possible to display the state of the fuel amount on a screen in the form of icon by using the pressure detector.

Further, considering the security, it is possible to lock the fuel tank and make the lighter unusable for a non-authorized person such as an infant. The extensible cylinder where the flame comes out from the burner keeps the flame off the housing of the portable electronic equipment to prevent from damage of burning the housing of the portable electronic equipment.

Although the lighter is applied to a clamshell cellular phone in the invention, it may be applied to a cellular phone of general type other than the above clamshell type and further, to the other portable electronic equipment, for example, a PDA (personal digital assistant) or a game player.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A lighter unit provided in portable electronic equipment having at least a key operation unit and a display unit, being included in a housing of said portable electronic equipment, which comprises:
    a fuel tank built in said housing,
    an ignition unit,
    a switch which controls the flow of fuel gas from said fuel tank to a burner portion provided at an end of said housing and operates said ignition unit to light a flame,
    a pressure detector which is set within said fuel tank in order to measure the amount of fuel,
    an internal state controller which controls said pressure detector, converts pressure data into fuel amount data, and stores the fuel amount data as latest fuel amount data,
    a controller which controls messages of pressure measurement request and pressure measurement reply between said internal state controller and said pressure detector, and
    a display controller which converts the latest fuel amount sent from said controller into predetermined data for display indicating the fuel amount, wherein
    said data for display is displayed on a screen of said display unit of said portable electronic equipment according to said display controller.

2. The lighter unit for the portable electronic equipment as set forth in claim 1, comprising
    a lock portion which opens and closes the cover of said fuel tank according to a control of said internal state controller.

3. A lighter unit provided in portable electronic equipment having at least a key operation unit, a display unit, and a fuel measuring unit which measures an amount of fuel remaining, being included in a housing of said portable electronic equipment, which comprises:
    a fuel tank built in said housing,
    an ignition unit, and
    a switch which controls the flow of fuel gas from said fuel tank to a burner portion provided at an end of said housing and operates said ignition unit to light a flame, and wherein said display unit displays content at one or more selected times on a screen in accordance with the amount of fuel remaining, and wherein
    an extensible cylinder is provided in said burner portion at the end of said housing,
    said switch is positioned at a lateral side of said housing in order to open and close a cover for covering said burner portion, when said switch opens said cover, the fuel gas of said fuel tank flows out from said extensible cylinder, and an ignition unit is operated to ignite the fuel gas, and
    said extensible cylinder is extended and protruded outward from said housing when said switch opens said cover and drawn in and accommodated into said housing when said switch closes said cover.

4. The lighter unit for the portable electronic equipment as set forth in claim 3, wherein
    said switch is positioned at a lateral side of said housing in order to open and close a cover for covering said burner portion, when said switch opens said cover, the fuel gas of said fuel tank flows out from said burner portion, and said ignition unit is operated to ignite the fuel gas.

5. The lighter unit for the portable electronic equipment as set forth in claim 3, wherein
    said lighter unit comprises a cartridge type fuel tank.

6. The lighter unit for the portable electronic equipment as set forth in claim 3, wherein
    said lighter unit comprises a fixed fuel tank.

7. The lighter unit for the portable electronic equipment as set forth in claim 3, wherein said content includes at least one of an icon indicating said amount, or a fuel amount value.

8. The lighter unit for the portable electronic equipment as set forth in claim 3, wherein, when said amount is less than a specified amount, an alarm message is displayed on the screen.

9. The lighter unit for the portable electronic equipment as set forth in claim 3, wherein said content is displayed in response to selection of a button of said key operation unit.

10. Portable electronic equipment having at least a key operation unit, a display unit, and a lighter unit for lighting a flame,
    wherein the lighter unit for lighting a flame is integrated into a housing of the portable electronic equipment,
    and wherein the key operation unit includes one or a plurality of buttons which can be integrated into the display unit, and including:
    a pressure detector which is set within a fuel tank of the lighter unit in order to measure the amount of fuel, an internal state controller which controls said pressure detector, converts pressure data into fuel amount data, and stores the fuel amount data as latest fuel amount data, a controller which controls messages of pressure measurement request and pressure measurement reply between said internal state controller and said pressure detector, and a display controller which converts the latest fuel amount sent from said controller into predetermined data for display indicating the fuel amount, wherein said data for display is displayed on a screen of said portable electronic equipment based on said display controller.

11. The portable electronic equipment with integrated lighter as set forth in claim 10, wherein an antenna body which does not protrude outward is integrated into said housing.

12. The portable electronic equipment with integrated lighter as set forth in claim 10, wherein said lighter unit comprises a cartridge type fuel tank.

13. The portable electronic equipment with integrated lighter as set forth in claim 10, wherein said lighter unit comprises a fuel tank built into said housing, an ignition unit, and a switch which controls the flow of fuel gas of said fuel tank to a burner portion provided at an end of said housing and operates said ignition unit to light a flame, and where said fuel tank is a cartridge type fuel tank.

14. The portable electronic equipment with integrated lighter as set forth in claim 10, wherein said lighter unit comprises a fixed fuel tank.

15. The portable electronic equipment with integrated lighter as set forth in claim 10, wherein said lighter unit comprises a fuel tank built in said housing, an ignition unit, and a switch controls the flow of fuel gas from said fuel tank to a burner portion provided at an end of said housing and operates said ignition unit to light a flame, and where said fuel tank is a fixed fuel tank.

16. The portable electronic equipment with integrated lighter as set forth in claim 10, wherein predetermined data for display indicating the fuel amount is displayed on said screen as icon.

17. The portable electronic equipment with integrated lighter as set forth in claim 10, wherein said data for display is displayed on a screen of said portable electronic equipment according to selection by a menu key of said operation unit.

18. The portable electronic equipment with integrated lighter as set forth in claim 10, comprising a lock portion which opens and closes the cover of said fuel tank according to a control signal of said internal state controller.

* * * * *